United States Patent [19]

Ford

[11] Patent Number: 5,220,998
[45] Date of Patent: Jun. 22, 1993

[54] GRINDER SAFETY SWITCH

[75] Inventor: David F. Ford, Springfield, Ill.

[73] Assignee: Bunn-O-Matic Corporation, Springfield, Ill.

[21] Appl. No.: 854,761

[22] Filed: Mar. 20, 1992

Related U.S. Application Data

[63] Continuation of Ser. No. 607,879, Nov. 1, 1990, abandoned.

[51] Int. Cl.⁵ .............................................. H01H 3/20
[52] U.S. Cl. ................................ 200/332; 200/61.83; 141/362; 241/36; 241/100
[58] Field of Search ............. 200/330, 332, 332.1, 200/337, 338, 573, 61.83, DIG. 18; 141/360, 361, 362; 99/286; 318/445, 446; 241/36, 37.5, 100, 33; D7/373

[56] References Cited

U.S. PATENT DOCUMENTS

| | | | |
|---|---|---|---|
| 2,309,246 | 1/1943 | Henry | 141/361 |
| 2,900,140 | 8/1959 | Schuhmann et al. | 241/100 |
| 3,849,615 | 11/1974 | Fisher | 200/332.1 |
| 3,935,410 | 1/1976 | Howard | 200/332 |
| 4,111,243 | 9/1978 | Fetterman | 141/362 X |
| 4,236,553 | 12/1980 | Reichenberger | 141/361 X |
| 4,388,508 | 6/1983 | Wilson | 200/352.1 |
| 4,509,569 | 4/1985 | Adolfsson | 141/360 |
| 4,607,200 | 8/1986 | Zimmerman | 318/484 |
| 4,679,715 | 7/1987 | Hovinga | 141/362 X |
| 4,685,624 | 8/1987 | Nidiffer et al. | 241/36 |
| 4,714,206 | 12/1987 | Nidiffer et al. | 241/100 |
| 4,831,221 | 5/1989 | Yu et al. | 200/332 X |
| 4,972,883 | 11/1990 | Hassell et al. | 141/362 X |
| 4,974,643 | 12/1990 | Bennett et al. | 141/360 |
| 5,008,500 | 4/1991 | Hamilton | 200/332 X |
| 5,045,657 | 9/1991 | Claar et al. | 200/332.1 |

FOREIGN PATENT DOCUMENTS 63849  11/1982  European Pat. Off. ............ 200/332

Primary Examiner—Henry J. Recla
Assistant Examiner—Glenn T. Barrett
Attorney, Agent, or Firm—Trexler, Bushnell, Giangiorgi & Blackstone, Ltd.

[57] ABSTRACT

For use with coffee bean grinders, a safety switch is actuated by a pivot arm having a pivot point located below a contact area at which a removeable container engages the pivot arm. The pivot arm pivots about the pivot point on a substantially horizontal axis between a forward and a retracted position. Also, the contact area is disposed forwardly of a vertical plane containing the pivot point and the horizontal axis. This construction reduces the amount of force necessary to move the pivot arm and actuate the switch. Because this force is smaller than before, this safety switch can be used with thin-walled containers, like plastic bags, without compromising the proper operation or safety of the grinder.

7 Claims, 1 Drawing Sheet

5,220,998

GRINDER SAFETY SWITCH

This application is a continuation of application Ser. No. 07/607,879, filed Nov. 1, 1990 now abandoned.

BACKGROUND AND SUMMARY OF THE INVENTION

This invention relates to an improvement of coffee bean grinders, and specifically to safety switches for use with those grinders. These grinders accept whole coffee beans and process them into coffee grinds, disposing of those grinds by means of a discharge chute into a bag or other suitable container. Due to the use of these grinders by the general public, especially in grocery stores, it is necessary that these grinders have a safety switch to prevent accidental operation.

In the past, safety switches have been employed successfully on coffee bean grinders. These switches are actuated by a gravity biased pivot arm which pivoted at a location above the area at which the bag engaged the pivot arm. The patent of Zimmerman, U.S. Pat. No. 4,607,200, and the patent of Nidiffer et al., U.S. Pat. No. 4,685,624, disclose such a pivot arm mechanism. Due to the position of the pivot point, the pivot arm required the application of a sizable force to actuate the switch. Bags, or other containers, having strong construction and thick walls were easily able to apply the necessary force to the pivot arm in order to actuate the switch.

Presently, however, those expensive, thick-walled bags have been replaced by inexpensive plastic bags. These plastic bags do not have the stiffness or resiliency of the previous bags, and are incapable of applying the necessary force to the pivot arm to actuate the safety switch. Therefore, a person operating the grinder is prone to apply excessive force to the bag, causing it to deform. A deformed bag reduces the effectiveness of the grinder, and impairs the proper operation of the grinder, and could compromise the safe operation of the grinder.

OBJECTS AND SUMMARY OF THE INVENTION

A general object of the invention is to improve the operation of safety switches used in coffee bean grinders by means of a new and unique construction of the pivot arm.

A further object of the invention is to provide a safety switch which can be used effectively with containers lacking the structural integrity demanded by the previous switches for proper operation of the grinder.

The present invention is a significant improvement over the previous safety switches in that it does not require a sizable force for actuation of the switch. Furthermore, a safety switch, constructed according to the teachings of the present invention, eliminates the problems associated with coffee bean grinders due to container deformation and application of excessive force.

The safety switch of the invention is actuated by a pivot arm which pivots at a point below the area at which the bag engages the pivot arm. Due to this pivoting location, the pivot arm requires a much smaller force than before to actuate the switch. Because of the small size of the force that the container need apply, the use of thin, plastic bags does not present an impediment to the proper operation of the safety switch or the grinder.

The person operating the grinder will not be encouraged to apply an excessive force to the container, thereby preventing its deformation. This gives greater assurance of proper operation of the grinder. Further, by locating the pivot arm pivot point below the area of contact with the bag, the shape of the pivot arm is not as critical to the proper operation of the safety switch or the grinder. More importantly, due to this pivot point location, a greater range of angles of the contact area of the pivot arm is possible. These improvements represent a significant improvement in safety switches, and in the safety and operation of coffee bean grinders.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which.

DETAILED DESCRIPTION OF THE ILLUSTRATED EMBODIMENT

Figure 1:
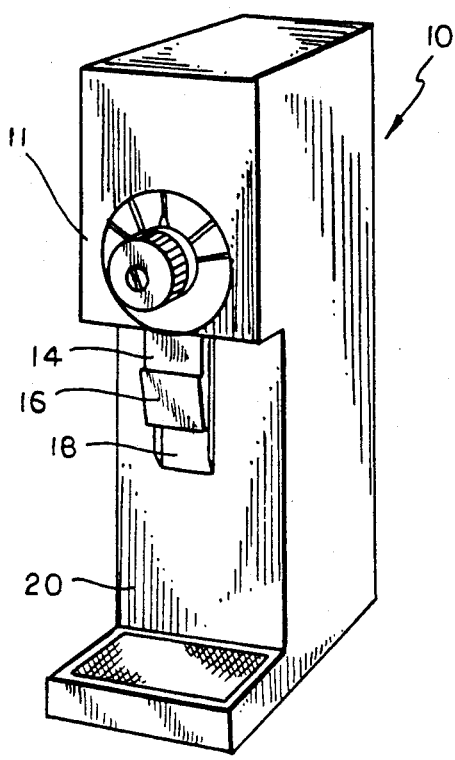
FIG. 1 is a frontal view of a coffee bean grinder possessing a safety switch constructed according to the teachings of the present invention.

While the invention may be susceptible to embodiment in different forms, there is shown in the drawings, and herein will be described in detail, a specific embodiment with the understanding that the present disclosure is to be considered an exemplification of the principals of the invention, and is not intended to limit the invention to that as illustrated and described herein.

In FIG. 1, a coffee grinder 10 containing a safety switch 12 constructed according to the teachings of the present invention is shown. The coffee grinder 10 has a grinding portion 11 containing an electric motor driven grinding mechanism, not shown, of known construction, and grinder housing 20, before which an operator places a container or bag 13. The electric motor of the grinding mechanism is connected for control by the safety switch 12. Also disposed in front of the grinder housing 20 is a discharge chute 14, which depends downwardly from the grinding portion 11. The discharge chute 14 accommodates the coffee grounds, and directs them into a container or bag 13, described below. The discharge chute 14 is comprised of a front portion 16 and a rear portion 18. The rear portion 18 is joined to the front portion 16, and extends downwardly beyond the front portion 16. The safety switch 12 is disposed on the grinder housing 20 behind the discharge chute 14.

Figure 2:
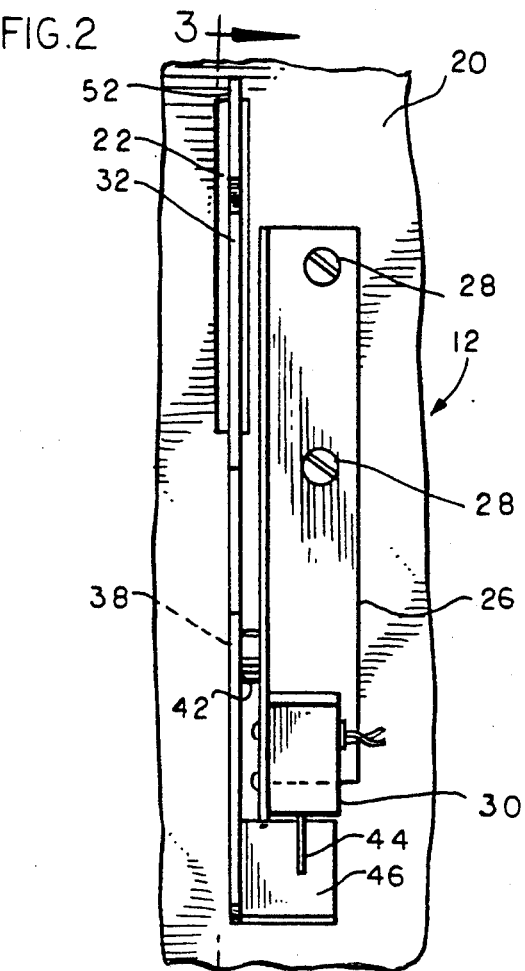
FIG. 2 is a cut-away rear view of a safety switch constructed according to the teachings of the present invention mounted on the rear of the grinder housing.
Figure 3:
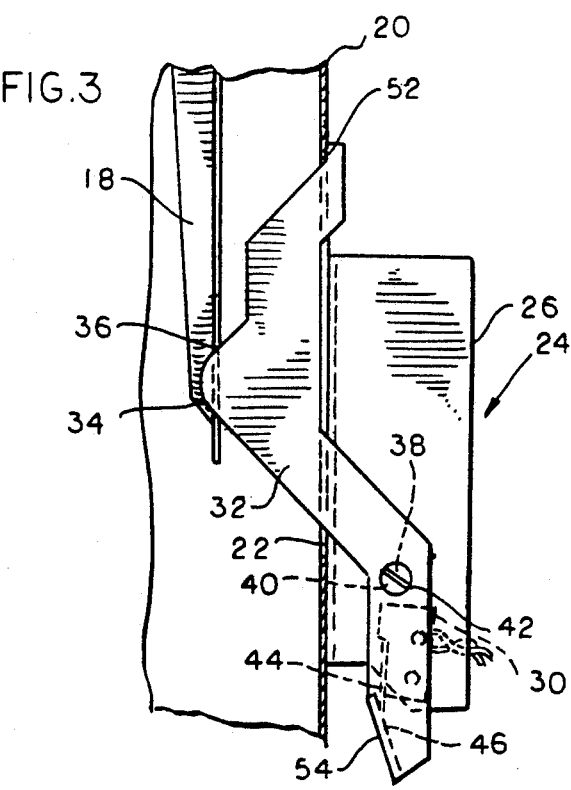
FIG. 3 is a sectional plan view of the safety switch, taken along line 3—3 of FIG. 2, showing the elements (generally indicated by the numeral 24) of that switch when at rest.

Referring to FIG. 2 and FIG. 3, a detailed depiction of the construction of the safety switch 12 is shown. The elements of the safety switch 12 are housed by a bracket assembly 26. The bracket assembly 26 is mounted on the grinder housing 20 by means of screws 28. The grinder housing 20 has an opening 22 in it, which allows an upstanding, gravity biased pivot arm 32 of the safety switch 12 to protrude outwardly to engage a rear portion 18 of the discharge chute 14. The bracket assembly 26 carries a spring biased switch 30 of known construction, such as disclosed in the patent of Zimmerman, U.S. Pat. No. 4,607,200, which controls the operation of the grinder motor.

The pivot arm 32 has a contact area 34, a pivot point 38, a pivot aperture 40, a stop portion 52, a foot portion 54 and a switch portion 46. The contact area 34 is located above the switch portion 46 and below the stop portion 52, with the pivot point 38 and pivot aperture 40 being disposed between the contact area 34 and the switch portion 46. The pivot aperture 40 is disposed with the pivot point 38 at its center. The contact area 34 is disposed above the pivot point 38 and forwardly thereof, so that the pivot arm 32 is biased by gravity to the forward or rest position shown in FIG. 3. The pivot aperture 40 is of sufficient size to accept a pivot pin 42. This pivot pin 42 connects the pivot arm 32 to the bracket assembly 26, and the pivot arm 32 pivots rotatably about the pivot point 38 and the pivot pin 42 on a substantially horizontal axis.

Figure 4:
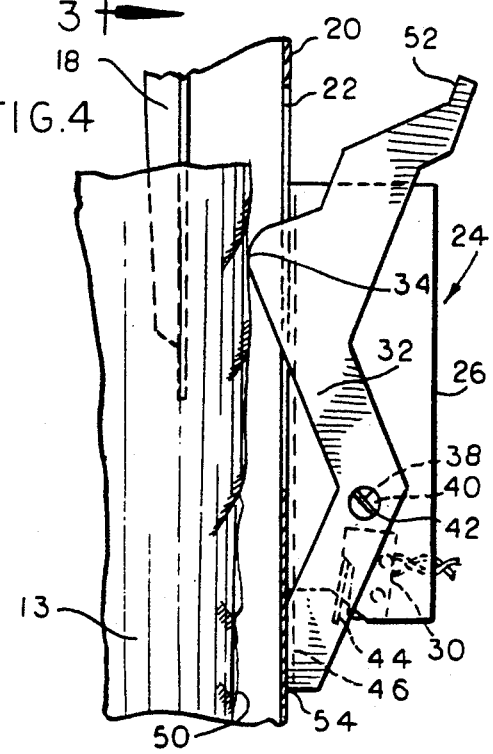
FIG. 4 is a sectional plan view of the safety switch, taken along line 3—3 of FIG. 2, showing the elements (generally indicated by the numeral 24) of that switch with a bag engaged.

With the structure of the pivot arm 32 described, it is to be noted that the contact area 34 of the pivot arm 32 will be offset forwardly of a vertical plane containing the pivot point 38. Further, the contact area 34 is located above the pivot point 38. Thus, gravity biases the pivot arm 32 toward the forward or rest position shown in FIG. 3. When the pivot arm 32 is moved inwardly manually or in a clockwise direction, as viewed in FIG. 3, the contact area 34 is moved toward the vertical plane containing the pivot point 38, thus reducing the length of the imaginary horizontal lever arm acted upon by the gravitational force, and increasing the imaginary vertical lever arm acted upon by the force applied by the bag 13. As the vertical lever arm is increased and the horizontal lever arm is reduced, the manual force required to move the pivot arm 32 toward, and to hold the pivot arm 32 in the retracted position of FIG. 4 is decreased and minimized. It is this characteristic that embodies the uniqueness of the present invention, and causes the safety switch to have the before-mentioned properties.

The grinder is constructed to accommodate the pivot arm 32 at rest, as shown in FIG. 3. The pivot arm 32 has a stop portion 52 which confronts the grinder housing 20, thus preventing the pivot arm 32 from becoming dislodged. Further, the rear portion 18 of the discharge chute 14 has an aperture 36. The aperture 36 is constructed so as to accept the contact area 34 of the pivot arm 32 when at rest. The switch portion 46 of the pivot arm 32 is constructed to actuate a spring biased switch arm 44 of the switch 30. It is the actuation of this switch arm 44 that governs the operation of the grinder. When the pivot arm 32 is at rest, as in FIG. 3, the switch portion 46 engages the switch arm 44, thereby compressing the switch arm 44, and the grinder is prevented from operating.

Referring to FIG. 4, the pivot arm 32 is shown not to be at rest, but to be engaged by a bag 13. Particularly, the bag 13 is placed in front of the grinder housing 20, under the grinding portion 11, with the bag 13 being disposed around the discharge chute 14. The bag wall 50 is slid up the rear portion 18 of the discharge chute 14, and between the rear portion 18 and the pivot arm 32. The bag wall 50 engages the pivot arm 32 at the contact area 34. The contact area 34 must be smooth and free of burrs and sharp edges so that the integrity of the bag 13 will not be damaged. The presence of the bag wall 50 imposes a force upon the contact area 34 which causes the pivot arm 32 to pivot rotatably about the pivot point 38 and pivot pin 42. When the pivot arm 32 so pivots, the switch portion 46 no longer engages the switch arm 44. When this occurs, and only when this occurs, the switch arm 44 is not compressed against the switch 30. When switch arm 44 is in this position, the switch 30 allows the grinder to operate normally. Also, when the pivot arm 32 is engaged by a bag 13, the foot portion 54 of the pivot arm 32 moves into contact with the grinder housing 20. The contact between the foot portion 54 and the grinder housing 20 prevents the pivot arm 32 from becoming dislodged when engaged by a bag 13.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention is claimed as follows:

1. A safety switch adapted for use with a grinder assembly having a discharge chute with a delivery end for egress of ground material to a container insertable at the delivery end for receiving ground material and removable therefrom, said safety switch comprising: a switch having adapted to be mounted to said grinder and a switch-on position adapted for energizing the grinder and a switch-off position; a switch controlling pivot arm adapted to be mounted to said grinder and having opposite ends, said pivot arm being pivotally mounted about a generally horizontal pivot axis intermediate said opposite ends, said arm pivoting about said axis in a limited and shallow arcuate path of travel; the pivot arm having a container contact area located above said pivot axis and adapted to be positioned adjacent said delivery end of said grinder assembly and laterally offset from a vertical plane containing the pivot axis such that said contact area of said pivot arm gravitationally biases said pivot arm towards an off position whereby said pivot arm contacts said switch and maintains said switch in said switch-off position and said arm being adapted to be moved by said container from said off position to an on position when said container is positioned at said delivery end of said discharge chute whereby said switch is switched to said switch-on position; and means for limiting the arcuate path of travel of said pivot arm such that said pivot arm is adapted to return to said off position upon removal of said container from said discharge chute whereby said switch returns to said switch-off position.

2. A safety switch according to claim 1, wherein the gravity biased pivot arm has a foot portion; the foot portion being disposed below said pivot axis; and the foot portion being adapted for engagement with said grinder assembly for preventing the gravity biased pivot arm from rotating beyond the switch-on position.

3. A safety switch according to claim 1, wherein the switch has a switch arm; and the gravity biased pivot arm having a switch controlling portion positioned for movement of the switch arm between switch-on and switch-off positions for moving said switch between said switch-on and switch-off positions.

4. A safety switch according to claim 3, wherein the switch controlling portion moves with the pivot arm.

5. In combination with a coffee grinder housing having a discharge chute with a delivery end adapted to deliver coffee grounds to fragile container positioned adjacent to the delivery end of the discharge chute and removable therefrom; the improvement comprising a switch having switch-on and switch-off positions for respectively energizing and de-energizing coffee grinder operation; a gravity biased switch controlling pivot arm mounted on the housing for pivotal movement about a horizontal pivot axis through a limited and shallow arcuate path of travel with bias toward the switch-off position, the pivot arm having a container contact area biased therewith to adjacency with the delivery end of the housing chute in switch-off position and adapted to engage with an inserted container urging the pivot arm to switch-on position; and means in association with the pivot arm for limiting the arcuate path of travel thereof such that the bias toward switch-off position is maintained.

6. The combination of claim 5 wherein the arcuate path of travel of the pivot arm remains above the horizontal pivot axis with the contact area of the pivot arm remaining offset from a vertical plane containing the horizontal pivot axis, thereby reducing the magnitude of force required by an inserted container for moving the gravity biased pivot arm to switch-on position.

7. The combination of claim 5 wherein the means for limiting the arcuate path of travel located on said pivot arm includes abutment surface portions of the pivot arm above and below the horizontal pivot axis for preventing movement thereof beyond the switch-on and switch-off positions.

* * * * *